United States Patent
Prabhu et al.

(10) Patent No.: US 9,311,311 B2
(45) Date of Patent: Apr. 12, 2016

(54) ARCHIVAL MANAGEMENT OF DATABASE LOGS

(71) Applicant: International Business Machines Corporation, Armonk, NY (US)

(72) Inventors: Pavithrananda S. Prabhu, Vellore (IN); Chandan K. Vishwakarma, Hazaribagh (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 329 days.

(21) Appl. No.: 14/039,025

(22) Filed: Sep. 27, 2013

(65) Prior Publication Data

US 2015/0095289 A1 Apr. 2, 2015

(51) Int. Cl.
*G06F 17/00* (2006.01)
*G06F 7/00* (2006.01)
*G06F 17/30* (2006.01)

(52) U.S. Cl.
CPC .... *G06F 17/30073* (2013.01); *G06F 17/30144* (2013.01); *G06F 17/30309* (2013.01); *G06F 17/30368* (2013.01)

(58) Field of Classification Search
CPC .......... G06F 17/30368; G06F 11/079; G06F 11/0706; G06F 11/0751; G06F 11/203; G06F 17/30371; G06F 2209/5018; G06F 9/542; G06F 11/00
See application file for complete search history.

(56) References Cited

U.S. PATENT DOCUMENTS

| | | | |
|---|---|---|---|
| 8,020,046 B2 | 9/2011 | Burghard et al. | |
| 8,140,483 B2 | 3/2012 | Mitchell et al. | |
| 8,219,749 B2 | 7/2012 | English | |
| 2007/0271570 A1* | 11/2007 | Brown | G06F 9/5033 718/105 |
| 2008/0183686 A1* | 7/2008 | Bhattacharyya | G06F 17/30377 |
| 2009/0316200 A1 | 12/2009 | Kubota et al. | |
| 2012/0101997 A1* | 4/2012 | Zwilling | G06F 11/1451 707/649 |
| 2012/0109895 A1* | 5/2012 | Zwilling | G06F 11/1471 707/648 |
| 2013/0042156 A1 | 2/2013 | Srinivasan et al. | |

FOREIGN PATENT DOCUMENTS

CN 104516943 A 4/2015

* cited by examiner

*Primary Examiner* — Angelica Ruiz
(74) *Attorney, Agent, or Firm* — Ronald Kaschak; Arnold B. Bangali

(57) ABSTRACT

A method for preventing suspension of transactions in a database computing system by monitoring active database logs of the database computing system is provided. The method comprises switching archive units of the database computing system due to full database log condition occurring during system operations of the database computing system. The method further comprises maintaining a database log history table, wherein the database log history table captures a threshold count of the active database logs generated by system threads of the database computing system. The method further comprises defining a temporary location for archiving the active database logs based on the switched archive units of the database computing system, and the maintained threadhold count of active database logs in the database log history table due to full database log condition occurring during system operations of the database computing system.

14 Claims, 5 Drawing Sheets

THREAD LOG HISTORY TABLE 125

| | THREAD STATUS [ACTIVE/INACTIVE/ SUSPENDED/RESUMED/...] 310 | URID 320 | LOG COUNT/URID 330 | UR 340 | TOTAL COUNT 350 |
|---|---|---|---|---|---|
| THREAD1 | ACTIVE/PRE-SUSPENDED | UR1<br>UR2<br>UR3 | 10,000<br>20,000<br>0 | COMMITTED<br>COMMITTED<br>UN-COMMITTED | 30,000 |
| THREAD2 | ACTIVE/PRE-SUSPENDED | UR1<br>UR2<br>UR3 | 5,000<br>1,000<br>0 | COMMITTED<br>COMMITTED<br>UN-COMMITTED | 6,000 |
| THREAD3 | ACTIVE/PRE-SUSPENDED | UR1 | 0 | UN-COMMITTED | 0 |

FIG. 3

ARCHIVAL MANAGEMENT OF DATABASE LOGS

FIELD OF THE INVENTION

The present invention relates generally to database operational activities of database computing systems, and more particularly to archival management of database logs of database computing systems.

BACKGROUND

A transaction (sometimes also referred to as a 'Unit-Of-Work' or 'UOW') is a set of related operations that must be completed together. All recoverable actions of the related operations must either complete successfully or not at all. This property of a transaction is referred to as 'atomicity'. In the simplest case, a transaction will access resources connected to a single computer processor. Such a transaction is referred to as a 'local transaction'. More often, however, a transaction will access resources which are located in several different computer processors, or logical partitions, each maintaining its own transaction log. Such a transaction is referred to as a 'distributed transaction'. When a distributed transaction ends, the atomicity property of transactions requires that either all of the processors involved commit the transaction or all of them abort the transaction. To achieve this, one of the processors takes on the role of coordinator to ensure the same outcome at all of the parties to the transaction, using a 'coordination protocol' that is commonly understood and followed by all the parties involved.

A two-phase commit protocol has been widely adopted as the protocol of choice in the distributed transaction management environment. This protocol guarantees that the work is either successfully completed by all its participants or not performed at all, with any data modifications being either committed together (completed) or rolled back (backed out) together on failure. Another property of a transaction is its durability. This means that once a user has been notified of success, a transaction's outcome must persist, and not be undone, even when there is a system failure. A recovery manager is used to ensure that a system's objects are durable and that the effects of transactions are atomic even when the system crashes.

The recovery manager saves information required for recovery purposes. This recovery can be for the dynamic backout of a transaction, perhaps as a result of a failure after a task updated a recoverable temporary storage queue. Additionally the recovery data can be used for restoring a transaction processing system to a committed state, for example when the system is restarted after system failure. Typically, the recovery file comprises at least one log containing the history of the transactions performed by a transaction processing system. In the event of a system failure, the recovery file can be played back to return the system to its state right before the failure, and to what the transaction log(s) used to check for and undo transactions that were not properly completed before failure.

Also, in the event of a transaction failure, the transaction log can be used to reverse updates that have been carried out by that transaction, by working backwards from the last change before the failure, hence the name 'dynamic transaction backout'. The backout occurs before any locks on any affected resources are released, which safeguards other tasks from the possibility of using corrupted data, because modified data is not released for use by them ("committed") until the current task has finished with it. In case the log needs to be replayed later in a system restart, an entry is first made in the log to indicate that that transaction is being backed out. Examples of systems which carry out such transaction logging include transaction systems such as IBM® CICS® Transaction Server or IBM WebSphere® Application Server, as well as database systems such as IBM DB2® or IBM IMS™. (IBM, CICS, WebSphere, DB2 and IMS are trademarks or registered trademarks of International Business Machines Corporation) in the United States, other countries, or both.). The log typically records the information in the order that the activity occurs. Without some management, this would consume an ever increasing amount of resource. So it must be reorganised on a regular basis so as to reduce its size by the recovery manager carrying out a process called 'keypointing'.

Keypointing comprises writing current committed values of a system's objects to a new portion of the recovery file, together with transaction status entries and intentions lists for transactions that have not been fully resolved. An intentions list for a transaction contains a list of the references and the values of all the objects/resources that are altered by that transaction, as well as information related to the two-phase commit protocol. Once a keypoint has been taken, i.e. information stored through a keypointing procedure, recovery information for irrevocably committed (or backed out) transactions can usually be discarded from the log, sometimes called 'trimming' the log. This reduces the file size of the log as well as the number of transactions to be dealt with during recovery.

The rate that old log records are deleted by trimming should ideally match the rate at which new log data is being generated as new work enters the transaction system and makes its own recoverable changes to resources. In a well tuned on-line transaction processing (OLTP) environment, the volume of log data held on the log should remain reasonably constant over time, with an underlying periodic rise and fall in the number of log records held on the log as both the new work and the housekeeping work are performed. This mechanism for log data deletion usually solves the problem of logs continually growing in size over time. However, a long-running UOW can prevent this mechanism from working as until such a UOW has completed, and its log data is no longer required, its data cannot be deleted from the log and all data logged since the first log entry of that UOW must be maintained on the log. Hence, the system will not be able to trim the log after keypointing, and the log will grow and grow in size. Eventually, when a critical threshold of the logging subsystem, the operating system, or the available hardware is exceeded, this will result in a request to write to the log failing for an "out of space" type of condition.

SUMMARY

In one embodiment of the present invention, a method for preventing suspension of transactions due to log full condition in a database computing system by monitoring active database logs of the database computing system is provided. The method comprises switching, by one or more processors, archive units of the database computing system due to full database log condition occurring during system operations of the active database logs. The method further comprises maintaining, by the one or more processors, a database log history table, wherein the database log history table captures a threshold count of the active database logs generated by system threads of the database computing system. The method further comprises defining, by the one or more processors, a temporary location for archiving the active database logs based on the switched archive units of the database computing system, and the maintained threadhold count of active database logs in the database log history table due to full database log condition occurring during system operations of the database computing system.

In another embodiment of the present invention, a computer system for preventing suspension of transactions in a database computing system by monitoring active database logs of the database computing system is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to switch archive units of the database computing system due to full database log condition occurring during system operations of the active database logs. The computer system further comprises program instructions to maintain a database log history table, wherein the database log history table captures a threshold count of the active database logs generated by system threads of the database computing system. The computer system further comprises program instructions to define a temporary location for archiving the active database logs based on the switched archive units of the database computing system, and the maintained threadhold count of active database logs in the database log history table due to full database log condition occurs during system operations of the database computing system.

In yet another embodiment of the present invention, computer program product for preventing suspension of transactions due to log full condition in a database computing system by monitoring active database logs of the database computing system is provided. The computer program product comprises one or more computer-readable tangible storage devices and program instructions stored on at least one of the one or more storage devices. The computer program product further comprises program instructions to switch archive units of the database computing system due to full database log condition occurs during system operations of the active database logs. The computer program product further comprises program instructions to maintain a database log history table, wherein the database log history table captures a threshold count of the active database logs generated by system threads of the database computing system. The computer program product further comprises program instructions to define a temporary location for archiving the active database logs based on the switched archive units of the database computing system, and the maintained threadhold count of active database logs in the database log history table due to full database log condition occurs during system operations of the database computing system.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

FIG. 3 illustrates a functional block diagram of a thread history table that is accessible to a database program application of a database computing system for maintaining active database log records generated by system threads of the database computing system that generates the active database log records faster than the database program application of the database computing system in accordance with embodiments of the present invention.

DETAILED DESCRIPTION

Figure 1:
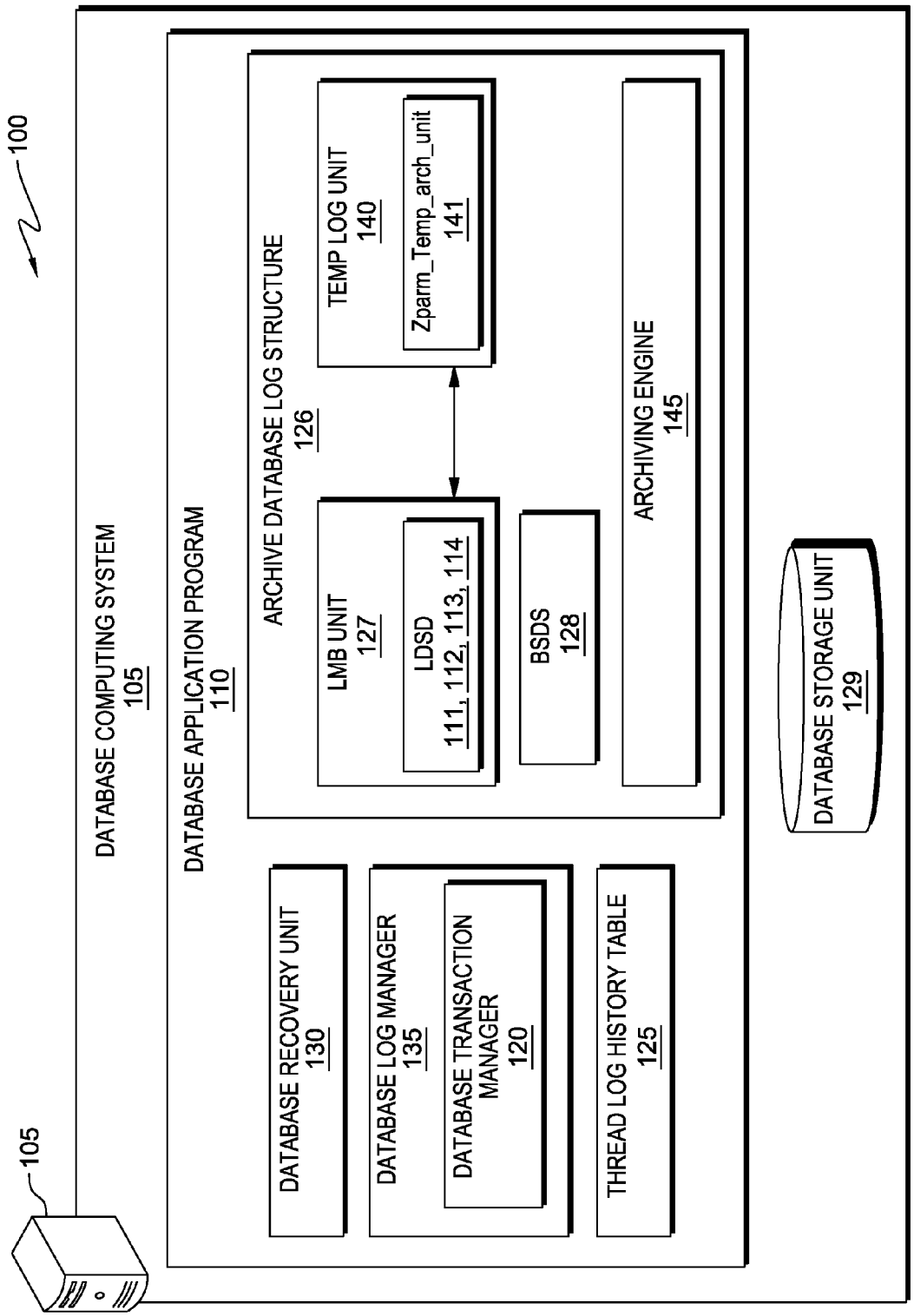
FIG. 1 is a functional diagram of a database management system (DBMS) environment for archiving active database logs of a DBMS computing environment, in accordance with embodiments of the present invention.

The present invention will now be described in detail with reference to the accompanying figures. Referring now to FIG. 1, DBMS environment 100 for archiving active database logs of DBMS computing environment 100, including, for example, preventing suspension of transactions of the active database logs, therefore, ensuring that the active database logs are available to a database system for processing in DBMS computing environment 100, is shown. The database system can be a DB2®. DB2® is a relational model database server (RDBMS) that is adapted to serve various operating systems, including, for example, Linux®, UNIX®, or z/OS® operating system platforms.

According to aspects of the present invention, database operational activities performed by database systems are typically maintained by the active database logs, wherein storage of the active database logs is utilized by the database system to recover from operational failures of DBMS computing environment 100. A database log is linear data set (LDS) that is structured to conform to virtual storage mechanisms, including, for, example, virtual storage access method (VSAM). Further, a database log can also be defined as a history of actions executed by the database system to guarantee atomicity, concurrency, isolation and durability (ACID) properties over crashes or hardware failures of the database system. For example, in the event that the database system updates transactional data in database objects, the type of update event, or transaction is recorded in the database log, along with all data of the database system.

Moreover, database logging mechanisms provide recovery of database operational failures of the database system, including, for example, synchronization, or repair of the database system due to crash or operational failure of the database system. The database system records data changes and other operational information in the database log, wherein the data changes generally include, for example, insert or update queries that are executed by the database system for recovering error, or operational failures of the database system. As a result, in certain circumstances that involves system malfunction of the database system, the database system can utilize logged information of transactions of the database logs to recover as much of the malfunctioned or corrupted data as possible. For example, such transactions are initially recorded in an active log in memory of the database system, thus providing quick access to the corrupted data. Consider, for example, a commit point measured by the database system for every ten insert Structured Query Language (SQL) statements that are executed by the database system. Also, consider, for example, during the fifth insert SQL statement, the database system crashes, since no commit measure was performed. For instance, according to aspects of the present invention, during operations of the database system, database logs are defined for logging operational activities of the database system. However, when the database system reaches a state where all sets of its database logs becomes full and consequently, the database system cannot perform any further database logging activities, the database system halts processing of the database logs of the database system, hence causing a log full condition of the database system.

Log full condition suspends transactions, or operations of the database system, and causes an outage to all new transactions of the database system, which requires database log records of the database system to be written. Log full condition occurs when the database system archives to storage tape of the database system. Further, if the database logs are offloaded to the storage tape, unavailability of hardware, or storage tapes prevent the database system from archiving the database logs. Log full condition also occurs when the database system is unable to archive data to a storage disk of the database system, particularly, if the storage of the disk is full. Therefore, in the event of a log full condition, the database system attempts to offload the database logs to various devices of the database system, or elements of the database system, until, or if the devices or elements of the database system become or are available to store the offloaded database logs.

The present invention provides switching of archive units of the database system due to log full condition occurs in the database system during system operations of the database system. The present invention further provides maintenance of system threads of a database log history table, and provision of a temporary location for archiving the active database logs based on the switched archive units of the database system, and the maintained threadhold count of the active database logs in the database log history table due to log full condition occurs during system operations of the database computing system. For example, the threshold count can be set by a systems administrator, or it can be a default value of the threshold count of the active database logs. The present invention specifically allows avoidance of log full condition during operations of the database system. For example, a threshold is set when archiving of the database logs is not occurring, however, when the threadhold is reached, temporary units are created by the database system to temporarily offload database logs to the temporary unit due to the log full condition occurs in the database system.

Consider, for example, a situation where there are five database logs of the database system that are set to be archived to tapes of the database system. Moreover, consider that the tapes are not available, and the database logs cannot be offloaded to the tapes. Therefore, in this case, the database system has reached its final active database log, and since it has determined that there is a hardware problem, in an embodiment of the present invention, the database system switches the archival media to another device due to the full log condition in database system.

DBMS archival environment 100 includes database computing system 105. Database computing system 105 is a server database computing system such as, a management server, a web server, or any other electronic device or computing system. The server computing system can also represent a "cloud" of computers interconnected by one or more networks, wherein the server computing system can be a primary server for a computing system utilizing clustered computers when accessed through a computing environment of database management system (DBMS) environment 100. For example, a cloud computing system can be a common implementation of a management system that prevents suspension or stopping of processing of transactions due to log full conditions of database computer system 105 by monitoring status of active database logs of database computing system 105, in accordance with at least one embodiment. Database computing system 105 includes database application program 110 and database storage unit 129. Database application program 110 executes program instructions to switch archive units of the database computing system 105 due to full database log condition occurs during system operations of database computing system 105. According to one aspect, SQL programs of database computing system 105 can execute as part of an application process of database application program 110, wherein the application process involves the execution of one or more programs of database application program 110.

Database storage unit 129 can be any type of storage device, storage server, storage area network, redundant array of independent discs (RAID), cloud storage device, or any type of data storage. For example, database storage unite 129 is a DB2® relational database management system. A RDBMS is a database that stores information from database logging activities of database computing system 105. Information stored in database storage unit 129 can be structured or unstructured information of database logs, including, a history of actions executed by database computing system 105 to guarantee ACID properties over crashes or operational hardware failures of database computing system 105.

Database application program 110 includes database recovery unit 130, database log manager 135, thread log history table 125, and archive database log structure 126. Database recovery unit 130 is a recoverable sequence of operations executed by database application program 110 for an application process of database application program 110. For example, if a unit of work of database computing system 105 involves changes to other recoverable resources of DBMS computing environment 100, the unit of work of database recovery unit 130 will be supported by other units of recovery of database recovery unit 130.

Database log manager 135 archives database log files of database system 105, and retrieves the database log files during recovery of database computing system 105. For example, database log manager 135 supports archiving media files of database computing system 105, wherein the database logs files of database computing system 105 can be archived to a disk location of database computing system 105. Database log manager 135 includes database transaction manager 120. Database transaction manager 120 assigns identifiers to transactions of database computing system 105, monitors progress of the transactions, and takes responsibility for completion and failure of the transactions during system operations of database computing system 105. For example, database log manager 135 provides database transaction manager 120 with functions that can be used to coordinate updating of several databases within a single unit of work. Database application program 110 automatically coordinates the unit of work of database log manager 135 and utilizes database log manager 135 to registers each transaction of database computing system 105.

Thread log history table 125 maintains active database log records generated by system threads of database computing system 105 that generates active database log records faster than database program application 110. For example, thread log history table 125 is temporary table of database computing system 105 that is created by database application program 110 when 25% of the all active database logs, or any specific threadhold count of the active database logs set by a system administrator is reached. According to at least one embodiment, thread log history table 125 is deleted by database application program 110 once database computing system 105 reaches a point where all active database logs of database computing system 105 are offloaded to an original device of database computing system 105 that was not available to archive the active database logs.

In the depicted embodiment, archive database log structure 126 offloads or transmits active database logs of database computing system 105 to temporary (temp) log unit 140 of database program application 110 due to log full condition occurs in DBMS computing environment 100. Temp log unit 140 includes zparm_temp_arch_unit 141, which provides parameter values for offloading the active database logs to temp log unit 140. For example, archive database log structure 126 also utilizes log management control block (LMB) unit 127, which includes two or more control blocks LDSD 111, 112, 113, and 114 for managing the active database logs. archive database log structure 126 also include bootstrap dataset (BSDS) 128, which stores the active database logs offloaded to temp log unit 140, along with corresponding units of the active database logs in temp log unit 140.

According to at least one embodiment of the present invention, archiving engine 145 archives the active database logs in temp log unit 140, if a device in database computing system 105 that is specified to archive the active database logs is not available. Moreover, once the device becomes available, archiving engine 145 transmits all the active database logs that were archived in temp log unit 140 to appropriate devices of database computing system, in accordance with at least one embodiment of the present invention.

Figure 2:
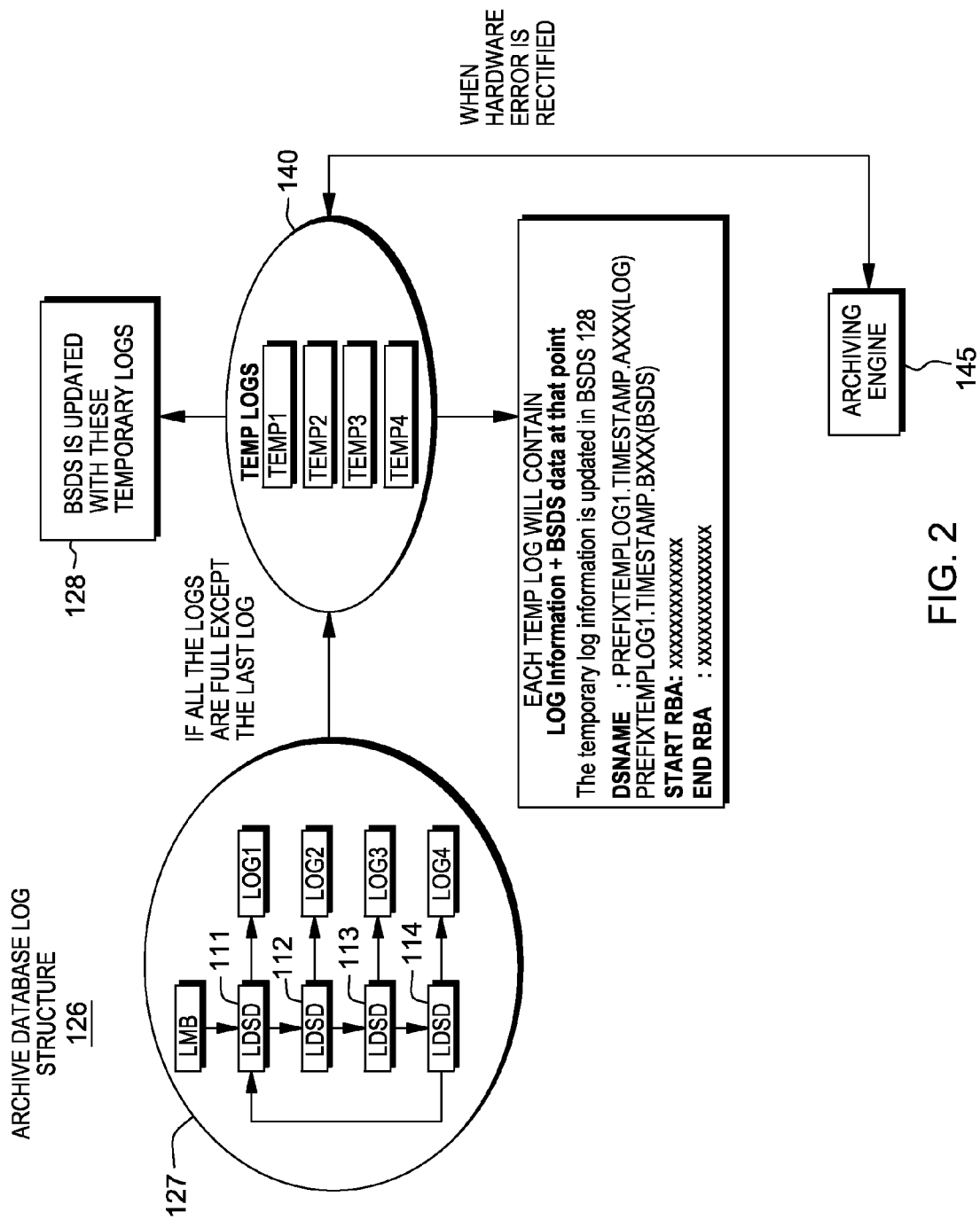
FIG. 2 is a functional diagram of a active database log structure for offloading or transmitting final active database logs of a database computing system to a temporary log unit of the database computing system due to log full condition occurs in a DBMS computing environment in accordance with embodiments of the present invention

FIG. 2 depicts a functional block diagram of active database log structure 126 for offloading or transmitting final active database logs of database computing system 105 to temporary log unit 140 due to log full condition occurs in DBMS computing environment 100 in accordance with embodiments of the present invention.

Database computing system 105 utilizes LMB unit 127 for managing its active database logs of database computing system 105. As depicted, LMB 127 has "chained" to it (i.e., the LMB 127 includes pointers to the head of a chain of) two or more control blocks LDSD 111, 112, 113, and 114, in a circular chain, with each LDSD 111, 112, 113, and 114, representing an active database log data set labeled LOG1, LOG2, LOG3, LOG4, respectively. LMB 127 also includes a pointer to archiving parameters of database computing system 105, wherein the temp log unit 140 can be created from the archiving parameters of LMB 127. For example, if database application program 110 determines a hardware malfunction of database computing system 105, wherein, in this case, database application program 110 waits for database application program 110 to reach its final active database log, database application program 110 switches archive units of database computing system 105 to temp log unit 140, and archives the active database logs to temp log unit 140. According to at least one embodiment, after the active database logs are transferred to the temp log unit 140, BSDS 128 is updated by database program application 110 with the active database logs of temp log unit 140. The location where the final active database logs of temp log unit 140 are created is determined by Zparm parameter temp_arch_unit 141 of database computing system 105 as described in FIG. 1. For example, as described, Zparm temp_arch_unit 141 is a system level parameter of database computing system 105 that defines, or describes operating characteristics of archiving parameter values of database system 105. In at least one embodiment, Zparm temp_arch_unit 141 can also include a dual archive unit, which can ensure that copies of the active database logs are archived to temp log unit 140.

Moreover, in order to acquire archiving parameter values of Zparm parameter temp_arch_unit 141, database program application 110 makes use of LMB unit 127, which includes archiving parameters from, wherein the temp log unit 140 can be created from the archiving parameters of LMB 127. As described, database computing system 105 utilizes LMB unit 127 to manage active logs of database computing system 105. LMB unit 127 includes a pointer to temp log unit 140 of database computing system 105. Temp log unit 140 contains two datasets, one dataset contains the active logs, and another dataset containing BSDS 128 at the point when archiving started, in which BSDS 128 is updated with the archived temporary logs of temp log unit 140. Furthermore, archiving engine 145 archives the entire temporarily stored active database log in temporary log unit 140. For example, in at least one embodiment of the present invention, archiving of final active database logs to temp log unit 140 is performed by archiving engine 145, if, for instance, archiving units of database system 105 that might be specified for the archiving the active database logs are not available.

FIG. 3 illustrates a functional block diagram of thread history table 125 of database program application 110, wherein thread history table 125 is accessible to database program application 110 for maintaining active database log records generated by system threads that generates the active database log records faster than database program application 110. According to at least one embodiment, database computing system 105 maintains a threshold count of final active database logs records generated by either of threads1, thread2, thread3 in thread log history table 125.

Consider, for example, a situation in which 50% of all the active database logs are full, in this case, database program application 110 maintains a record of the number of active database active logs generated by either of threads1, thread2, thread3, which are the system threads currently running or operating in thread log history table 125 of database computing system 105. Moreover, in an example, where 50% of all active database logs are full, unit of recovery (UR) 340 of either of thread1, thread2, thread3 is determined by database program application 110 along with its system thread details, including, for example, thread status 310, URID 320, log count/URID 330, UR 340, and total count 350. UR 340 is the work that changes the data in database computing system 105 from one point of consistency to another. URID 320 identifies a unit of work of UR 340.

URID 320 is the relative byte address of the begin-UR of active database logs that indicates the start of that unit of recovery of the active database logs. For example, in the depicted environment, UR1 is the URID 320 of the unit of recovery which is currently in progress for thread3, wherein thread3 indicates the system thread. For each UR1, UR2, UR3, etc., URID 320 is assigned by database program application 110, and its corresponding active database logs which are maintained using a linked list data structure. For example, database program application 110 begins UR record marks of the active database logs of database computing system 105. For example, when UR record is created, an UR counter is also created for the UR, and this counter is incremented whenever a new log is added to the UR. So when the UR ends we have the Total count which is updated in thread log history table 125. Thread log history table 125 maintains the total count of committed UR's+uncommitted UR's of all the system threads. For example, if either of corresponding thread1, thread2, or thread3 is identified for the completed UR 340 then URID 320 and total count 350 for either of thread1, thread2, or thread3 is updated in the thread log history table 125. In this case, thread status 310 for each URID 320 is changed from Un-Committed to Committed thread. Also, consider, for example, a situation where database computing system 105 reaches a point where the final active database log is 0% full, in this case, database application program 110 determines all the actively operating URs, including, log count of all the operating URs, and updates thread log history table 125 of the log count of the operating URs.

Moreover, database program application 110 searches thread log history table 125 to determine if either of thread1, thread2, thread3 generated the most number of active database logs of database computing system 105. Once a system thread of either of thread1, thread2, thread3 that generated the most number of active database logs of database log history table 125 is found, the system thread is temporarily suspended. In another example, consider a situation where there are more than one system threads that generate more database active logs faster than database application program 110. In such a situation when 25% of the final active database logs are full and database application program 110 has not started archiving the final database active logs, database application program 110 verifies thread log history table 125 to determine a second system thread of either of thread1, thread2, thread3 that generated the most number of active database logs of database computing system 105 and suspends the second system thread, in accordance with an embodiment of the present invention.

However, if suspension of the second system thread does not solve the issue of either of thread1, thread2, or thread3 generating more active database logs faster than database application program 110, as described above, then at 50% of capacity of the final active database logs in database application program 110, then the third system thread of either of thread1, thread2, thread3 which has generated the maximum active database logs is identified and is suspended by database application program 110. Now, in this case, database application program 110 starts archiving the active database logs to the temporary log unit 140. When all the final active logs are archived to the temp log unit 125, database application program 110 resumes either of thread1, thread2, or thread3 which were suspended. For instance, if database application program 110 resumes the threads which were suspended, some of the entries of either of threads1, thread2, thread3 in thread log history table 125 are updated. For example, for each of either of thread1, thread2, thread3 which was resumed, thread status 310 for the resumed thread is changed from suspended to active/pre-suspended.

According to at least one embodiment, once database application program 110 switches archive units of database computing system 105 to temp log unit 140, and archives the final active database logs to temp log unit 140, and also once database application program 110 suspends or resumes any transaction of database computing system 105, database application program 110 transmits a message to a system administrator of database computing system 105 of an update of the suspended or resume transaction of database application program 110.

Moreover, after third system thread of either of thread1, thread2, thread3 is resumed, database application program 110 verifies, first if any of the previously suspended threads of either of thread1, thread2, thread3 is causing a similar logging problem, if either of thread1, thread2, thread3 is causing a similar logging problem, database application program 110 suspends all of systems threads of either of either of thread1, thread2, thread3. Otherwise the database application program 110 suspends the thread which has generated the most number of active log records starting from the previous cycle values. Moreover, if a same system thread of either of thread1, thread2, thread3 is suspended more than a system administrator's specified threshold of system threads, then that thread will be permanently suspended.

Figure 4:
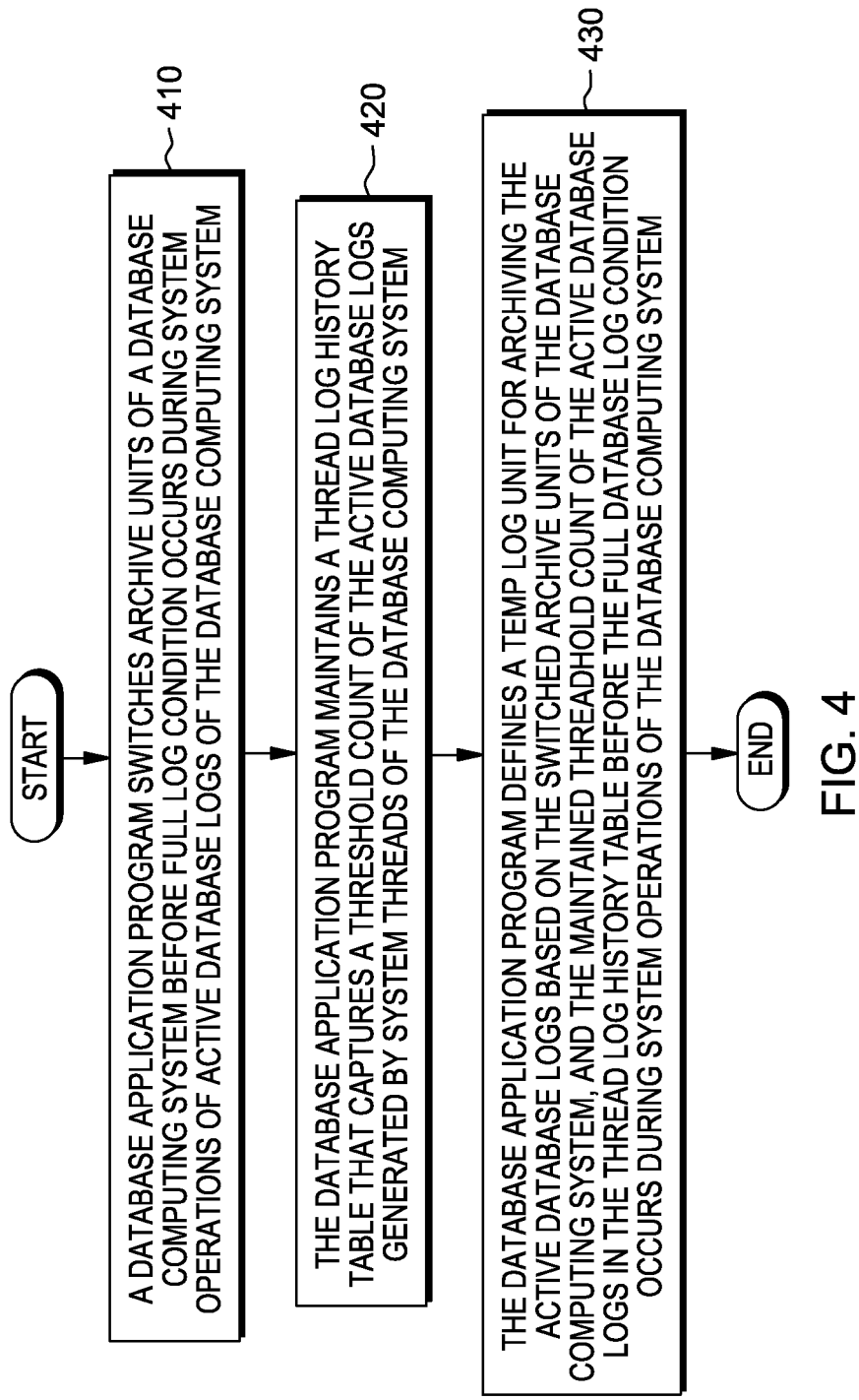
FIG. 4 is a flow diagram depicting steps performed by a database application program to prevent suspension of transactions due to log full condition in a database computing system by monitoring active database logs of the database computing system, including, offloading the active database logs in temporary log unit due to log full conditions occurs in the database computing system in accordance with embodiments the present invention

FIG. 4 is a flow diagram depicting steps performed by database application program 110 to prevent suspension of transactions in database computing system 105 by monitoring active database logs of database computing system 105, including, offloading the active database logs in temp log unit 140 due to log full conditions occurs in database computing system 105 in accordance with embodiments the present invention.

Database application program 110 switches archive units of the database computing system 105 due to full log condition occurs during system operations of the active database logs of database computing system 105. (Step 410). Database application program 110 further maintains thread log history table 125, wherein thread log history table 125 captures a threshold count of the active database logs generated by system threads of database computing system 105. (Step 420). For example, database application program 110 determines if a system/hardware failure or database full log condition is caused by the system threads that generate active database logs faster than database computing system 105. If the log full condition is caused by the system thread of database computing system 105, then database application program 110 further suspends generation of the active database logs by the system threads temporarily, for example, by determining system threads with the highest number of active database logs, and suspending system threads the based on a threshold of a count of the active database logs in a thread log history table 125, and wherein thread log history table 125 maintains a record of active and suspended system threads of the database computing system 105. Database application program 110 further searches thread log history table 125 for a record of active and suspended system threads of the database computing system 105. For example, it repeats this for some specified threshold after which it suspends the system thread permanently. For example, database application program 110 further defines temp log unit 140 for archiving the active database logs based on the switched archive units of database computing system 105, and the maintained threshold count of active database logs in thread log history table 125 due to full database log condition occurs during system operations of the database computing system 105. (Step 430). This is done because there can be a combination of both system failure of database computing system 105 and system threads writing more logs of database computing system 105. As described, database log full condition suspends transactions, or operations of the database system, and causes an outage to all new transactions of the database computing system 105, which require log records of database computing system 105 to be written.

According to at least one embodiment of the present invention, BSDS 128 includes a record of dataset that includes the active database logs, and a record of dataset that includes BSDS 128 of the archived active database logs of temp log unit 140. For example, database application program 110 determines a cause of a system failure or database log condition due to the full database log condition occurs during system operations of the active database logs of database computing system 105. Database application program 110 further determines a cause of a system failure or database log condition due to the full database log condition occurring in during system operations of the active database logs, wherein archiving of the active database logs to temp log unit 140 occurs without suspending or halting system operations of database computing system 105. Moreover, the cause of the system failure or database log condition is not addressed until the active database logs reaches a final active database log status, wherein the active database logs are archived in temp log unit 140 when the active database logs reaches the final active database log status, and wherein the final active database log status is based on another threadhold count of active database log records.

Figure 5:
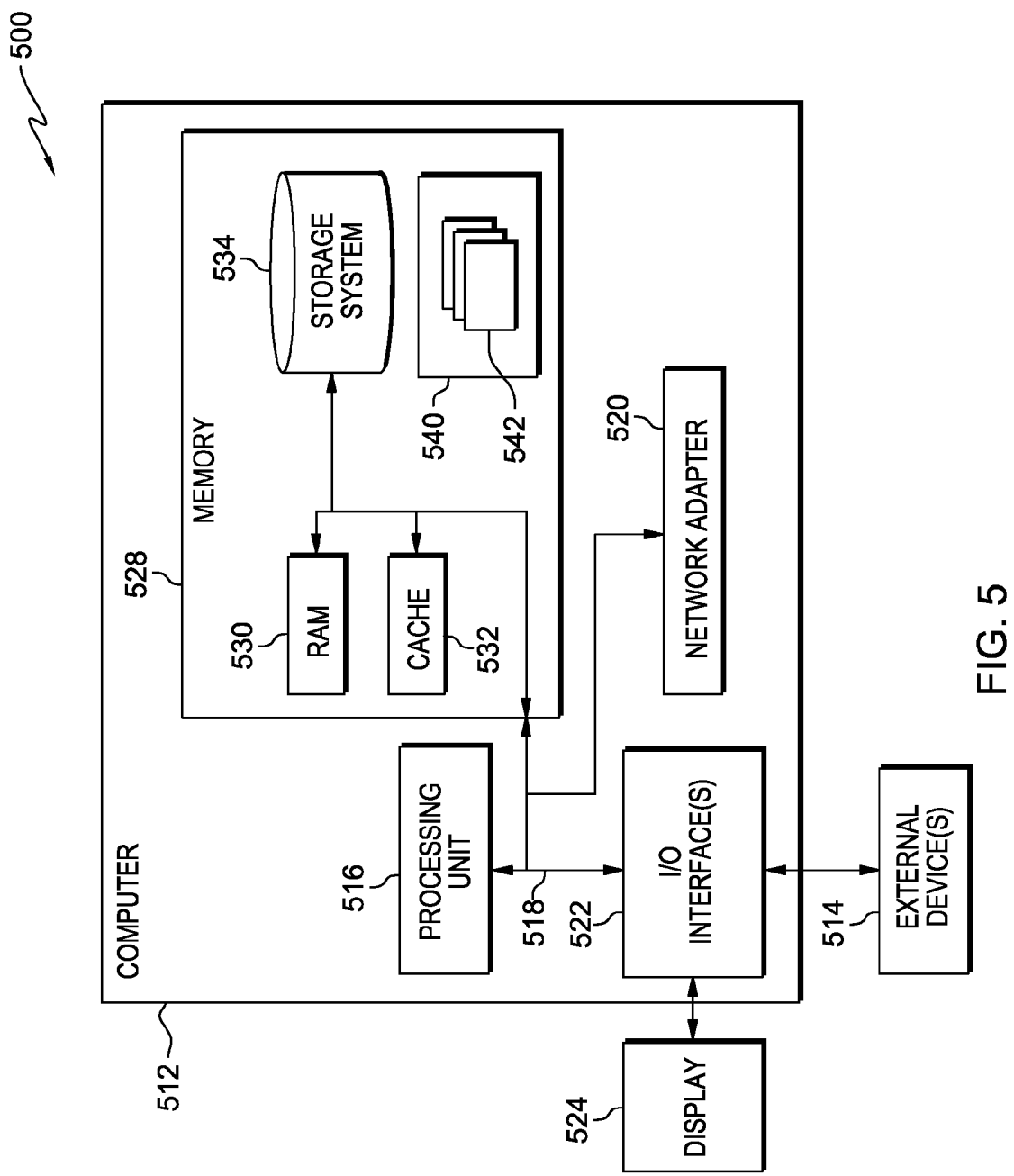
FIG. 5 illustrates a block diagram of components of a computer system in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Database computing system 105 can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 630 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Database application program 110 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Database application program 110 can be implemented as an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for preventing suspension of transactions in a database computing system by monitoring active database logs of the database computing system have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. Therefore, the present invention has been disclosed by way of example and not limitation.

What is claimed is:

1. A method for preventing suspension of transactions in a database computing system by monitoring active database logs of the database computing system, the method comprising the steps of:

switching, by one or more processors, archive units of the database computing system due to full database log condition occurring during system operations of the active database logs;

maintaining, by the one or more processors, a database log history table, wherein the database log history table captures a threshold count of the active database logs generated by system threads of the database computing system;

determining, by the one or more processors, a cause of system failure or database log condition due to the full database log condition occurring during system operations of the active database logs;

archiving of the active database logs to a temporary location without suspending or halting system operations of the database computing system, wherein the temporary location includes a record of dataset that includes the active database logs, and a record of dataset that includes boot strap data of the archived active database logs of the temporary location; and defining, by the one or more processors, a position in the temporary location for archiving the active database logs based on the switched archive units of the database computing system, and the maintained threadhold count of active database logs in the database log history table due to full database log condition occurring during system operations of the database computing system, wherein the active database logs are archived in the temporary location when the active database logs reaches the final active database log status, and wherein the final active database log status is based on another threadhold count of active database log records.

2. The method according to claim 1, wherein the cause of the system failure or database log condition is not addressed until the active database logs reaches a final active database log status.

3. The method according to claim 1, further including the steps of:
   determining, by the one or more processors, if a system failure or database log condition is caused by the system threads that generates active database logs faster than the database computing system; and
   suspending, by the one more or more processors, generation of the active database logs by the system threads, if the system threads generates final active database logs of the active database logs faster than the database computing system.

4. The method according to claim 3, wherein the system thread with the highest number of active database logs is suspended based on a threadhold of a count of the active database logs in a database log history table, and wherein a database log history table maintains a record of active and suspended system threads.

5. The method according to 3, wherein the step of determining, by the one or more processors, if a system failure or database log condition is caused by the system threads that generates active database logs faster than the database computing system, further includes the steps of:
   searching, by the one or more processors, a database log history table for a record of active and suspended system threads of the database computing system; and
   archiving, by the one or more processors, final active database logs in the temporary location.

6. A computer system for preventing suspension of transactions in a database computing system by monitoring active database logs of the database computing system, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
   program instructions to switch archive units of the database computing system due to full database log condition occurring during system operations of the active database logs;
   program instructions to maintain a database log history table, wherein the database log history table captures a threshold count of the active database logs generated by system threads of the database computing system;
   program instructions to determine a cause of system failure or database log condition due to the full database log condition occurring during system operations of the active database logs;
   program instructions to archive the active database logs to a temporary location without suspending or halting system operations of the database computing system, wherein the temporary location includes a record of dataset that includes the active database logs, and a record of dataset that includes boot strap data of the archived active database logs of the temporary location; and
   program instructions to define a position in the temporary location for archiving the active database logs based on the switched archive units of the database computing system, and the maintained threadhold count of active database logs in the database log history table due to full database log condition occurring during system operations of the database computing system, wherein the active database logs are archived in the temporary location when the active database logs reaches the final active database log status, and wherein the final active database log status is based on another threadhold count of active database log records.

7. The computer system according to claim 6, wherein the cause of the system failure or database log condition is not addressed until the active database logs reaches a final active database log status.

8. The computer system according to claim 6 further includes:
   program instructions to determine if a system failure or database log condition is caused by the system threads that generates active database logs faster than the active database logs are archived in the temporary location; and
   program instructions to suspend generation of the active database logs by the system threads, if the system threads generates final active database logs of the active database logs faster than the database computing system.

9. The computer system according to claim 8, wherein the system thread with the highest number of active database logs is suspended based on a threadhold of a count of the active database logs in a database log history table, and wherein a database log history table maintains a record of active and suspended system threads.

10. The computer system according to claim 8, wherein program instructions to determine if a system failure or database log condition is caused by the system threads that generates active database logs faster than the active database logs are archived in the temporary location, further includes:
   program instructions to search a database log history table for a record of active and suspended system threads of the database computing system; and
   program instructions to archive final active database logs in the temporary location.

11. The computer system according to claim 6, wherein the cause of the system failure or database log condition is not addressed until the active database logs reaches a final active database log status.

12. A computer program product for preventing suspension of transactions in a database computing system by monitoring active database logs of the database computing system, the computer program product comprising:
   one or more computer-readable tangible storage devices and program instructions stored on at least one of the one or more storage devices, the program instructions to switch archive units of the database computing system due to full database log condition occurring during system operations of the active database logs;
   program instructions to maintain a database log history table, wherein the database log history table captures a threshold count of the active database logs generated by system threads of the database computing system;
   program instructions to determine a cause of system failure or database log condition due to the full database log condition occurring during system operations of the active database logs;
   program instructions to archive the active database logs to a temporary location without suspending or halting system operations of the database computing system, wherein the temporary location includes a record of dataset that includes the active database logs, and a record of dataset that includes boot strap data of the archived active database logs of the temporary location; and program instructions to define a position in the temporary location for archiving the active database logs based on the switched archive units of the database computing system, and the maintained threadhold count of active database logs in the database log history table due to full database log condition occurring during system operations of the database computing system, wherein the active database logs are archived in the temporary location when the active database logs reaches the final active database log status, and wherein the final active database log status is based on another threadhold count of active database log records.

13. The computer program product according to claim 12 further includes:

program instructions to determine if a system failure or database log condition is caused by the system threads that generates active database logs faster than the active database logs are archived in the temporary location; and program instructions to suspend generation of the active database logs by the system threads, if the system threads generates final active database logs of the active database logs faster than the database computing system.

14. The computer program product according to claim 13, wherein program instructions to determine if a system failure or database log condition is caused by the system threads that generates active database logs faster than the active database logs are archived in the temporary location, further includes:

program instructions to search a database log history table for a record of active and suspended system threads of the database computing system; and program instructions to archive final active database logs in the temporary location.

* * * * *